Feb. 21, 1928.

G. F. HUTTON 1,659,821

HOOK AND ROPE CARRIER

Filed July 29, 1926

INVENTOR
Geo. F. Hutton

BY
ATTORNEY

Patented Feb. 21, 1928.

1,659,821

UNITED STATES PATENT OFFICE.

GEORGE F. HUTTON, OF STOCKTON, CALIFORNIA.

HOOK AND ROPE CARRIER.

Application filed July 29, 1926. Serial No. 125,681.

This invention relates to improvements in automobile accessories and particularly to a device for carrying or holding luggage and bundles of various kinds thereon.

There are of course various luggage carriers now on the market arranged especially for attachment to the running-board of the vehicle. All such devices are rigid and unyielding and can therefore only accommodate such articles as will fit between the carrier and the side of the car. Further their carrying capacity is usually somewhat limited.

The principal object of my invention is to provide a carrier device which may be detachably connected to practically any part of the vehicle as may be desired and by means of which any luggage or bundles of practically any size and shape within reason, may be quickly and firmly secured against movement relative to the vehicle, whether on the running-board, the roof of the car or elsewhere.

My device therefore should prove extremely useful to campers who carry tents, rolls of bedding and various other odd shaped bundles on their cars and have at present no proper and easily operated means for lashing such bundles in place.

My device is also of such a nature that it may serve as a clothes line when in camp and it may also be used in emergencies as a tow line, or for guy rope purposes for a tent. When the device is detached from the car it may be folded up into a very compact form so that it may be then stowed away in any odd space available.

While primarily intended for passenger automobile use, the device may also be made in sizes usable in connection with trucks and other vehicles, to enable furniture, lumber, boxes and other objects being firmly lashed in place onto the vehicle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
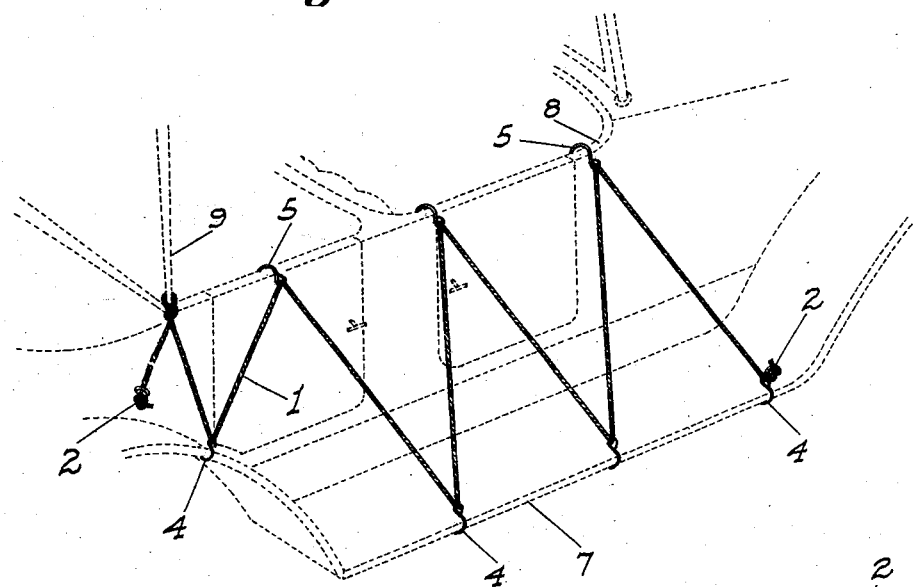
Fig. 1 is a fragmentary perspective outline of an automobile showing my improved carrier as attached to the running-board and the adjacent side of the car for holding luggage and the like on said running-board.
Figure 2:
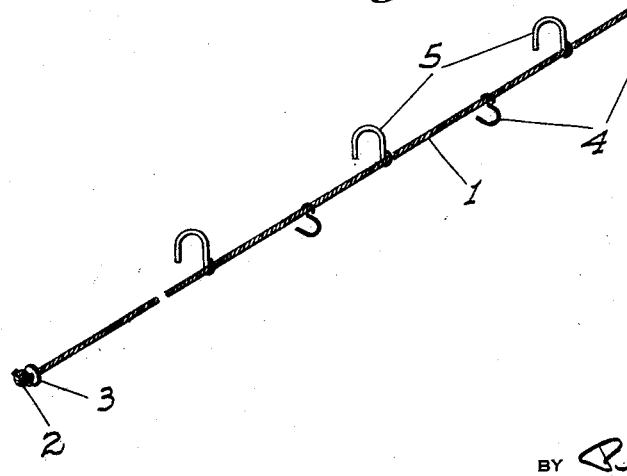
Fig. 2 is a fragmentary perspective view of the carrier device detached showing the relative positions of the other members.
Figure 3:
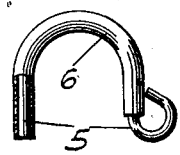
Fig. 3 is a side elevation of one type of the hook members employed.

Referring now more particularly to the characters of reference on the drawings, the carrier comprises in the main a single length 1 of manila or other rope, a flexible steel cable, or any similar flexible member which is preferably a good many feet in length though this of course can be varied to suit different requirements. This member for the sake of convenience and simplicity of language is hereinafter designated as a rope. Both ends of the rope are knotted as at 2, a large washer 3 or the like being preferably placed on the rope adjacent the knot at one end. Slidable on the rope between the knotted ends is a plurality of rigid hooks 4 of suitable size, the openings of all said hooks facing in one direction when hanging loose on the rope. As many of said hooks may be mounted as may be desired, four or five being usually sufficient. Likewise slidably mounted on the rope and disposed alternately to or between the hooks 4 is a similar number of other hooks 5, the openings of said hooks 5 all facing in one direction which is the opposite to that of the hooks 4, when said hooks 5 are likewise hanging slack or free on the rope.

The hooks 5 are preferably somewhat larger than the hooks 4 and for the major portion of their extent at least are covered with sheaths of rubber 6 or the like. Both hooks are preferably U-shaped rather than substantially circular or oval as is usual to enable said hooks to properly engage and hang over rectangular or parallel sided surfaces. In operation assuming for instance that the device is to be attached to the running-board and the adjacent side of the car, to hold bundles resting on the running-board, the hooks are first slid toward one end of the rope. The hook 4 nearest said end, said hook being ahead of any hook 5, is then engaged with the outer edge of the running-board 7 adjacent either end of the bundle. The following hook on the rope, which in this case will be one of the type 5, is then hung over the side 8 or door of the car, in a longitudinal plane some distance toward the opposite end of the bundle. The succeeding hook 4 is then engaged with the running-board still further toward the opposite end of the bundle and so on until the latter is engaged by the zig-zagging runs of the rope, which will of course be formed as the rope is payed out, with the hanging of the different hooks in place. The rope being flexible will tend of course to follow the contour of the bundle, presuming that the latter projects outwardly beyond a direct line between the outer edge of the running-board and the top of the side of the car; and being pulled taut as the hooks are successively engaged with the respective parts of the car will thus hold the bundle securely against the side of the car. When the bundle is thus strapped in place the free end of the rope beyond the engaged hooks may then be made fast about any suitable fixed member of the car, such as a top bow upright 9. This of course will prevent any of the hooks from jarring loose while the car is in motion.

If the bundle is short the distance between successive hooks lengthwise of the car is of course lessened so as to avoid such a distance between adjacent runs of the rope as would permit the bundle to project therebetween and possibly work its way out. This is accomplished without any initial adjustment of the hooks being necessary since the hooks are free to slide on the rope and there is no fixed distance therebetween such as would be had if the hooks were fixed in a definite position on the rope. This feature of course also makes it immaterial as to the exact distance between the outer edge of the running-board and the top of the side of the car.

If a bundle is to be carried on the roof of the car, as is sometimes done, the hooks are alternately engaged with the top bow frames on opposite sides of the car, the runs of the rope between the hooks extending over the bundle and strapping the same firmly against the roof. Similarly if articles are carried on the trunk rack on the back of the car, the hooks may be alternately engaged with the side frames of the rack and pressed over said articles.

While any article will be thus firmly maintained against displacement, it is but the work of a moment to loosen the rope and disengage the hooks, as will be evident.

If it is desired to use the device as a clothes line it is only necessary to stretch the rope between two trees or other vertical members. The hooks then hang free and being slidable along the rope may be moved to any desired point on the rope and are then in suitable position to support clothes hangers or other articles.

The hooks 5 being covered with rubber, there is no danger of the paint work on the car being scratched or otherwise marred. The hooks 4 may be similarly covered but it is not necessary, since they are primarily intended to engage the relatively rough running-board. The rope being knotted at both ends, the hooks are permanently mounted on said rope and cannot become lost. At the same time if more or less hooks are desired either knot can be undone so as to apply or remove the hooks. The two sets of hooks facing in opposite directions they are properly positioned to engage spaced and fixed members between which the runs of the rope are to extend without twisting the rope while thus placing it.

If desired however the rope when being applied may be given a turn or two about the hook-eyes by turning the hooks in order to prevent slippage of the hooks and rope. For a closed car, where the hooks cannot well hang over the doors or sides of the car, the hooks 5 are made smaller, so that they may be engaged with the door handles or hinges, or with the windshield frame or other member.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A carrier device comprising a single length of a flexible element having its free ends free of each other, and a plurality of hook members permanently and slidably mounted on said element.

2. A carrier device consisting solely of a length of a flexible element, and means permanently mounted on said element for enabling the latter to extend in the form of alternating runs between spaced and relatively fixed objects.

3. A carrier device comprising a single length of a flexible element, and members permanently and slidably mounted on said element for detachable engagement with spaced and fixed objects.

4. A carrier device comprising a single continuous length of a flexible element, and a plurality of hook members permanently mounted on the element intermediate its ends and independently slidable therealong for detachable engagement with spaced and fixed objects.

5. A carrier device comprising a single length of a flexible element whose ends are free of each other, and hook members provided with eyes opposite the hook portions, the element being slidably passed through the eyes and being then permanently associated with the hook members.

In testimony whereof I affix my signature.

GEORGE F. HUTTON.